United States Patent
Moore

(10) Patent No.: US 11,467,345 B2
(45) Date of Patent: Oct. 11, 2022

(54) SYSTEMS AND METHODS FOR A STELLATE BEAM SPLITTER

(71) Applicant: Playhard, Inc., Boulder, CO (US)

(72) Inventor: Jerry Moore, Boulder, CO (US)

(*) Notice: Subject to any disclaimer, the term of this patent is extended or adjusted under 35 U.S.C. 154(b) by 0 days.

(21) Appl. No.: 15/229,765

(22) Filed: Aug. 5, 2016

(65) Prior Publication Data

US 2017/0038534 A1   Feb. 9, 2017

Related U.S. Application Data

(60) Provisional application No. 62/201,484, filed on Aug. 5, 2015.

(51) Int. Cl.
*G02B 6/28* (2006.01)

(52) U.S. Cl.
CPC ......... *G02B 6/2848* (2013.01); *G02B 6/2817* (2013.01)

(58) Field of Classification Search
CPC .................. G02B 6/2848; G02B 6/2817
See application file for complete search history.

(56) References Cited

U.S. PATENT DOCUMENTS

| | | | |
|---|---|---|---|
| 251,712 A * | 1/1882 | Goldsmith | F21V 5/04 362/335 |
| 3,786,246 A | 1/1974 | Johnson et al. | |
| 4,288,942 A | 9/1981 | Nicholl | |
| 4,382,656 A * | 5/1983 | Gilby | G01J 3/0216 356/326 |
| 4,431,196 A | 2/1984 | Kutnyak | |
| 4,700,075 A * | 10/1987 | Kurz | G01T 1/202 250/368 |
| 4,869,699 A | 9/1989 | Plambeck et al. | |
| 4,963,142 A * | 10/1990 | Loertscher | A61F 9/00802 604/21 |
| 5,002,350 A * | 3/1991 | Dragone | G02B 6/12011 385/24 |
| 5,058,978 A * | 10/1991 | Kondoh | G02B 6/125 385/43 |
| 5,089,055 A * | 2/1992 | Nakamura | B64G 1/443 136/248 |
| 5,102,227 A * | 4/1992 | Zwirner | G01B 11/024 356/446 |
| 5,436,805 A * | 7/1995 | Hsu | G02B 6/0006 362/559 |

(Continued)

FOREIGN PATENT DOCUMENTS

CN   100408134 C   8/2008
CN   101292114 A   10/2008

(Continued)

OTHER PUBLICATIONS

Flashlight—OurStory, available at https://flashflight.com/pages/our-story.*

(Continued)

*Primary Examiner* — Peter Radkowski
(74) *Attorney, Agent, or Firm* — Haynes and Boone, LLP

(57) ABSTRACT

A stellate beam splitter includes a light cavity for receiving a light source and a plurality of radial arms oriented around the light cavity, the plurality of radial arms oriented to concentrate light entering each of the plurality of radial arms at an end proximate to the light cavity and provide concentrated light at an end distal to the light cavity.

17 Claims, 3 Drawing Sheets

(56) References Cited

U.S. PATENT DOCUMENTS

| | | | |
|---|---|---|---|
| D390,282 S | 2/1998 | Burdick | |
| D401,288 S | 11/1998 | Dunipace | |
| D402,318 S | 12/1998 | Dunipace | |
| 5,842,765 A * | 12/1998 | Cassarly | G02B 6/0006 362/21 |
| 5,882,239 A | 3/1999 | Trichak | |
| 5,915,823 A | 6/1999 | Simon | |
| 6,013,025 A * | 1/2000 | Bonne | A61B 1/07 348/68 |
| 6,242,984 B1 * | 6/2001 | Stones | H01P 5/107 330/295 |
| 6,306,083 B1 * | 10/2001 | Bonne | A61B 1/07 362/574 |
| 6,336,738 B1 * | 1/2002 | Feuermann | G02B 6/0006 362/551 |
| 6,354,725 B1 * | 3/2002 | Simon | F21V 5/02 362/147 |
| D466,562 S | 12/2002 | Peterson | |
| 6,502,956 B1 * | 1/2003 | Wu | F21V 14/06 257/E25.028 |
| 6,512,864 B1 * | 1/2003 | Lin | G02B 6/12011 385/24 |
| 6,536,921 B1 | 3/2003 | Simon | |
| 6,560,038 B1 * | 5/2003 | Parkyn, Jr | G02B 6/4298 359/726 |
| D478,944 S | 8/2003 | Peterson | |
| 6,783,421 B1 | 8/2004 | Lopez | |
| 6,836,600 B2 * | 12/2004 | Doerr | G02B 6/12016 385/129 |
| 6,857,770 B2 * | 2/2005 | Moore | A63H 33/22 362/253 |
| 6,900,059 B1 * | 5/2005 | Shinn | G01N 21/253 422/64 |
| 6,973,236 B2 * | 12/2005 | So | G02B 6/12011 385/37 |
| 7,009,213 B2 * | 3/2006 | Camras | H01L 33/58 257/98 |
| D527,428 S | 8/2006 | Cooper | |
| D553,278 S | 10/2007 | Moore | |
| 7,347,758 B2 * | 3/2008 | Moore | A63H 33/18 446/219 |
| D572,315 S | 7/2008 | Sowinski | |
| 7,513,635 B2 * | 4/2009 | Ahsan | A47G 33/00 362/121 |
| 7,524,091 B2 | 4/2009 | King | |
| 7,635,194 B2 * | 12/2009 | Kim | G02F 1/133603 362/561 |
| 7,677,760 B2 * | 3/2010 | Simon | F21V 5/046 362/235 |
| 7,798,681 B2 * | 9/2010 | Wang | F21V 7/09 362/335 |
| 7,837,370 B2 * | 11/2010 | Bierhuizen | G02B 27/095 362/555 |
| 7,841,741 B2 * | 11/2010 | Chan | F21V 29/004 362/227 |
| 7,889,430 B2 * | 2/2011 | El-Ghoroury | H04N 5/74 359/641 |
| D638,279 S | 5/2011 | Plato | |
| 8,248,560 B2 * | 8/2012 | Kim | G02B 6/0061 349/112 |
| 8,441,602 B2 * | 5/2013 | Kim | G02B 6/0061 264/1.1 |
| D714,398 S | 9/2014 | Oblack et al. | |
| 8,926,153 B2 * | 1/2015 | Meng | H01L 33/58 362/555 |
| D725,197 S | 3/2015 | Thompson | |
| D725,713 S | 3/2015 | Thompson | |
| D725,714 S | 3/2015 | Kim | |
| 9,162,404 B2 * | 10/2015 | Doerr | B29D 11/00663 |
| D742,430 S | 11/2015 | Moris | |
| 9,243,774 B2 * | 1/2016 | Kim | G02B 6/0061 |
| 9,341,754 B2 * | 5/2016 | Maekawa | G02B 5/0231 |
| 9,423,101 B2 * | 8/2016 | Holten | F21V 5/00 |

| | | | |
|---|---|---|---|
| 2002/0080622 A1 | 6/2002 | Pashley et al. | |
| 2003/0162470 A1 | 8/2003 | Peterson | |
| 2004/0022070 A1 * | 2/2004 | Moore | A63H 33/18 362/555 |
| 2004/0043694 A1 | 3/2004 | Cohen et al. | |
| 2005/0106746 A1 * | 5/2005 | Shinn | G01N 21/532 436/164 |
| 2005/0207705 A1 * | 9/2005 | Laurent-Lund | G02B 6/125 385/45 |
| 2006/0012778 A1 * | 1/2006 | Vaughnn | G01N 21/8806 356/237.2 |
| 2006/0166589 A1 * | 7/2006 | Moore | A63H 33/18 446/47 |
| 2006/0285318 A1 * | 12/2006 | Ahsan | A47G 33/00 362/121 |
| 2006/0291207 A1 * | 12/2006 | Simon | F21V 5/046 362/245 |
| 2007/0139798 A1 * | 6/2007 | Epstein | F21V 5/02 359/831 |
| 2007/0212973 A1 | 9/2007 | Brockes et al. | |
| 2007/0263298 A1 * | 11/2007 | El-Ghoroury | H04N 5/74 359/726 |
| 2008/0030974 A1 * | 2/2008 | Abu-Ageel | F21V 13/04 362/19 |
| 2008/0062714 A1 * | 3/2008 | Kim | G02F 1/133603 362/609 |
| 2008/0238323 A1 * | 10/2008 | Chan | F21V 29/004 315/35 |
| 2008/0277680 A1 * | 11/2008 | Bertram | H01L 51/5268 257/98 |
| 2009/0046468 A1 * | 2/2009 | Wang | F21V 7/09 362/297 |
| 2009/0199784 A1 | 8/2009 | Oblack et al. | |
| 2010/0091498 A1 * | 4/2010 | Bierhuizen | G02B 6/0028 362/268 |
| 2011/0242821 A1 | 10/2011 | Pan | |
| 2012/0147621 A1 * | 6/2012 | Holten | F21V 5/00 362/551 |
| 2012/0176772 A1 * | 7/2012 | Maekawa | G02B 5/0278 362/97.1 |
| 2012/0224805 A1 * | 9/2012 | Doerr | B29D 11/00663 385/24 |
| 2012/0225739 A1 | 9/2012 | Cheshire et al. | |
| 2013/0099263 A1 | 4/2013 | Heacock et al. | |
| 2014/0293642 A1 * | 10/2014 | Meng | H01L 33/58 362/555 |
| 2015/0124435 A1 | 5/2015 | Masterman et al. | |

FOREIGN PATENT DOCUMENTS

| | | | | |
|---|---|---|---|---|
| CN | 101341601 A | | 1/2009 | |
| CN | 102472472 A | | 5/2012 | |
| CN | 103840237 A | * | 6/2014 | |
| DE | 102008028490 A1 | * | 12/2009 | G02B 21/0004 |
| EP | 0151556 A2 | * | 8/1985 | G02B 6/2817 |
| JP | 01100983 A | * | 4/1989 | G02B 6/2852 |
| WO | WO 99/13266 A1 | | 3/1999 | |
| WO | WO 2004/002599 A1 | | 1/2004 | |
| WO | WO 2007/046059 A1 | | 4/2007 | |
| WO | WO 2011/021135 A1 | | 2/2011 | |

OTHER PUBLICATIONS

International Search Report dated Nov. 18, 2016 issued in related PCT App. No. PCT/US2016/045843 (2 pages).

Written Opinion dated Nov. 18, 2016 issued in related PCT App. No. PCT/US2016/045843 (7 pages).

Flashlight LED Light UP Golf Disc by Playhard. Webpage dated 2002-2016, found online [Apr. 25, 2016] http://flashflight.com/collections/discs-balls/products/flashflight-led-light-up-golf-disc-driver.

LED Frisbee by Alibaba. Dated 2016. Found online [Apr. 25, 2016] http://www.alibaba.com/product-detail/LED-Frisbee-Multi-Colored-Fiber-optic_60441106234.html?spm=a2700.7724857.29.96.45WPpO.

(56) References Cited

OTHER PUBLICATIONS

LED Red Frisbee by Nite-ize on Amazon dated Aug. 15, 2013. Found online [Apr. 25, 2016] http://www.amazon.com/Nite-ize-Flashflight-Light-Flying-Disc/dp/B001EPVGEE/ref=pd_bxgy_200_img_2?ie=UTF8&refRID=1S2DKX40X9P4EQ8CDNCD.
Full Size Low by Flyin' Fox on ebay. Dated Apr. 15, 2016. Found online [Apr. 25, 2016] http://www.ebay.com/itm/Full-Size-Glow-in-the-Dark-Frisbee-Flying-Disc-w-Bright-Changing-Multi-Colors-/131725582874.
European Search Report dated Feb. 27, 2019 issued in parallel European patent application No. 16833952.1 (7 pages).
Office Action dated Sep. 28, 2020 issued in related Chinese patent application No. 201680053098.4 (13 pages).

\* cited by examiner

SYSTEMS AND METHODS FOR A STELLATE BEAM SPLITTER

CROSS-REFERENCE TO RELATED APPLICATIONS

This application claims the benefit of U.S. Provisional Application No. 62/201,484, filed on Aug. 5, 2015, which is incorporated herein by reference in its entirety.

FIELD

This disclosure relates in general to transmission and broadcast of light, and more particularly to a compact optical apparatus for splitting a single light source into multiple radial beams.

BACKGROUND

The efficiency, reliability, and compact size of light emitting diodes (LEDs) make them increasingly attractive for use in lighting devices of all kinds. The isolated semiconductor die comprising the heart of an LED is essentially a point source of light that radiates in all directions. A number of designs exist that, when used in conjunction with an LED, can constrict, concentrate, diffuse, or redirect the multidirectional emission of the LED. These devices generally use a combination of masks, lenses, or reflectors integral or external to the capsuled dielectric housing of the LED in order to manipulate the direction and intensity of the consolidated output beam of light.

A number of systems for concentrating or diffusing this multidirectional radiation in specific patterns useful for particular applications have been developed or improved. One approach is to mold the exterior surface of the dielectric casing which houses the semiconductor die in the form of a convex or concave lens. This method provides a means of transmitting a light emitted from the semiconductor die through the lens surface in a roughly conical beam collinear with the axis of the LED. U.S. Pat. No. 5,865,529 granted Feb. 2, 1999, to Ellis Yan discloses such a device for diffusing light in a 360° viewing plane in both horizontal and vertical axes. However, this method cannot focus the dominant portion of emitted light at an angle substantially away (i.e., >45°) from the symmetric axis of the LED and lens while simultaneously excluding radiation at shallower angles to the symmetric axis (i.e., <45°).

Another approach is to provide a silvered or refractive reflector mechanically separate from the LED which is aligned to intercept light radiated along the axis of the LED and reflect it in a pattern suitable for the particular application. Unlike the lens method, this approach allows for deflection of the dominate portion of the emitted light at significant angles away from the symmetric axis of the LED while excluding radiation at shallower angles. U.S. Pat. No. 5,769,532 granted Jun. 23, 1998, to H. Sasaki; U.S. Pat. No. 6,364,506 B1 granted Apr. 2, 2002, to M. Gallo; U.S. Pat. No. 6,447,155 B2 granted Sep. 10, 2002, to T. Kondo and H. Okada; and U.S. Pat. No. 6,846,101 B2 granted Jan. 25, 2005, to C. Choushaine all disclose devices employing such a mechanically separate reflector to redirect light from an LED. The mechanical arrangement of the LED and separate reflector increases the complexity, space required, alignment difficulty, and cost for this assembly.

A third approach is to mold the exterior surface of the dielectric casing of the LED in the form of a concave cone of faceted planes or approximating curves which, by means of total internal reflection, redirects light emitted by the LED die away from the axis of the LED. These methods allow diffusion of light at substantial angles from the axis of the LED. U.S. Pat. No. 3,774,021 granted Nov. 20, 1973, to B. Johnson and U.S. Pat. No. 6,488,392 B1 granted Dec. 3, 2002, to C. Lu both disclose devices using convex planar or curved surfaces to randomly diffuse light emitted from a semiconductor die in a roughly radial direction away from the symmetric axis of the LED. However, neither method produces a uniform dispersion of the reflected light consisting of parallel rays oriented at a precise angle relative to the symmetrical axis of the LED.

None of these existing approaches provide a compact apparatus for efficiently splitting the redirected planar output of a single LED into a multiplexed array of beams which can act as individual light sources suitable for optical coupling with light pipes or optical fibers.

SUMMARY

In one embodiment, a system for a stellate beam splitter includes a stellate optical beam splitter that, when coupled with a source of roughly planar light emission originating near its geometric center, concentrates the source radiation into a radial array of output windows. Each output window can act as a separate re-radiating light source or can alternately be optically coupled to a light pipe or optical fiber. The number of potential radial output windows is dependent on the dimensional geometry of the light source and output window.

In one embodiment, a stellate beam splitter includes a light cavity for receiving a light source and a plurality of radial arms oriented around the light cavity, the plurality of radial arms oriented to concentrate light entering each of the plurality of radial arms at an end proximate to the light cavity and provide concentrated light at an end distal to the light cavity. Optionally, each of the plurality of radial arms is a light concentrator. Alternatively, each of the plurality of radial arms narrows from the end proximate to the light cavity to the end distal to the light cavity. In one configuration, each of the plurality of radial arms has an approximately triangular prism shape. In another configuration, each of the plurality of radial arms has a side surface, the side surface being a surface running along the length of the radial arm and perpendicularly vertical as compared to the primary direction of light exiting the radial arm. In one alternative, each of the plurality of radial arms has a joining plane, the joining plane being a plane extending radially from a center of the light cavity to the point where any two side surfaces of the plurality of radial arms intersect. In another alternative, the angle between the joining plane and the side surface is less than a critical angle for total internal reflection, based on an index of refraction for a material that the plurality of radial arms comprise and an index of refraction for air surrounding the plurality of radial arms. Alternatively, the material is a transparent material and the index of refraction for the material is greater than 1.4. Optionally, a conical or rotated concave curve reflector is oriented in the light cavity, the conical reflector positioned to be centered on the light source, such that light from the light source reflects in an approximately planar fashion.

In another embodiment, a stellate beam splitter includes a light source in the light cavity, the light source projecting light in an approximately planar fashion, and a plurality of radial arms oriented around the light cavity, the plurality of radial arms oriented to concentrate light entering each of the plurality of radial arms at an end proximate to the light cavity and provide concentrated light at an end distal to the light cavity. Optionally, each of the plurality of radial arms is a light concentrator and each of the plurality of radial arms narrows from the end proximate to the light cavity to the end distal to the light cavity. Alternatively, each of the plurality of radial arms has an approximately triangular prism shape, each of the plurality of radial arms has a side surface, the side surface being a surface running along the length of the radial arm and perpendicularly vertical as compared to the primary direction of light exiting the radial arm, and each of the plurality of radial arms has a joining plane, the joining plane being a plane extending radially from a center of the light cavity to the point where any two side surfaces of the plurality of radial arms intersect. Optionally, the radial arms have the form of a truncated cone. In one alternative, the angle between the joining plane and the side surface is less than a critical angle for total internal reflection, based on an index of refraction for a material that the plurality of radial arms comprise and an index of refraction for air surrounding the plurality of radial arms. In another alternative, the material is a transparent material and the index of refraction for the material is greater than 1.4. In yet another alternative, a conical reflector is oriented in the light cavity, the conical reflector positioned to be centered on the light source, such that light from the light source reflects in an approximately radial fashion. Optionally, the light source is in a removable lighting module. Alternatively, the removable lighting module includes an LED that projects light in a single primary direction. Optionally, the single primary direction is perpendicular to and towards the conical reflector.

DETAILED DESCRIPTION

Figure 1:
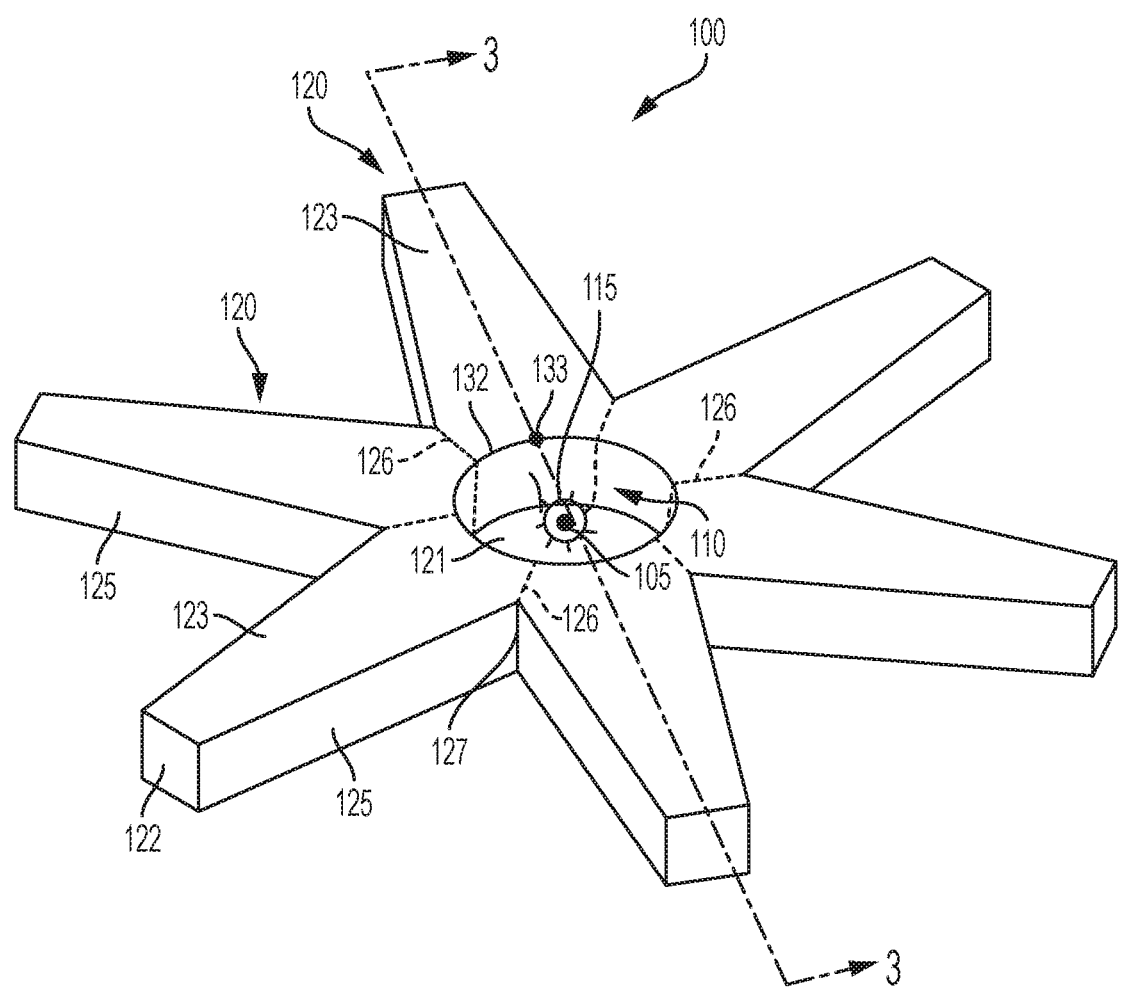
FIG. 1 is an isometric view of one embodiment of a stellate beam splitter.

Certain terminology is used herein for convenience only and is not to be taken as a limitation on the embodiments of the systems and methods for a stellate beam splitter. In the drawings, the same reference letters are employed for designating the same elements throughout the several figures. Generally, embodiments of a stellate beam splitter include a cavity for receiving a module having a light source. The module having a light source generally emits light in a planar fashion. The stellate beam splitter is designed to concentrate light emanating from the light source into two or more beams, while still providing for a translucent area in the middle of the beam splitter. In many embodiments, the stellate beam splitter accomplishes this by providing radial arms that concentrate light from the light source. In many embodiments, three or more radial arms are used. In the embodiment shown, six radial arms are used. The six radial arms are light concentrators. Each of the radial arms accepts light from the light source and concentrates the light as the radial arm narrows. The radial arms have an index of refraction greater than one and, therefore, tend to direct light down the radial arm with minimal loss of light in a direction perpendicular to the sides of the radial arms. In many embodiments, optical fibers may be positioned at the ends of the radial arms to further transmit light concentrated by the radial arms.

Figure 2:
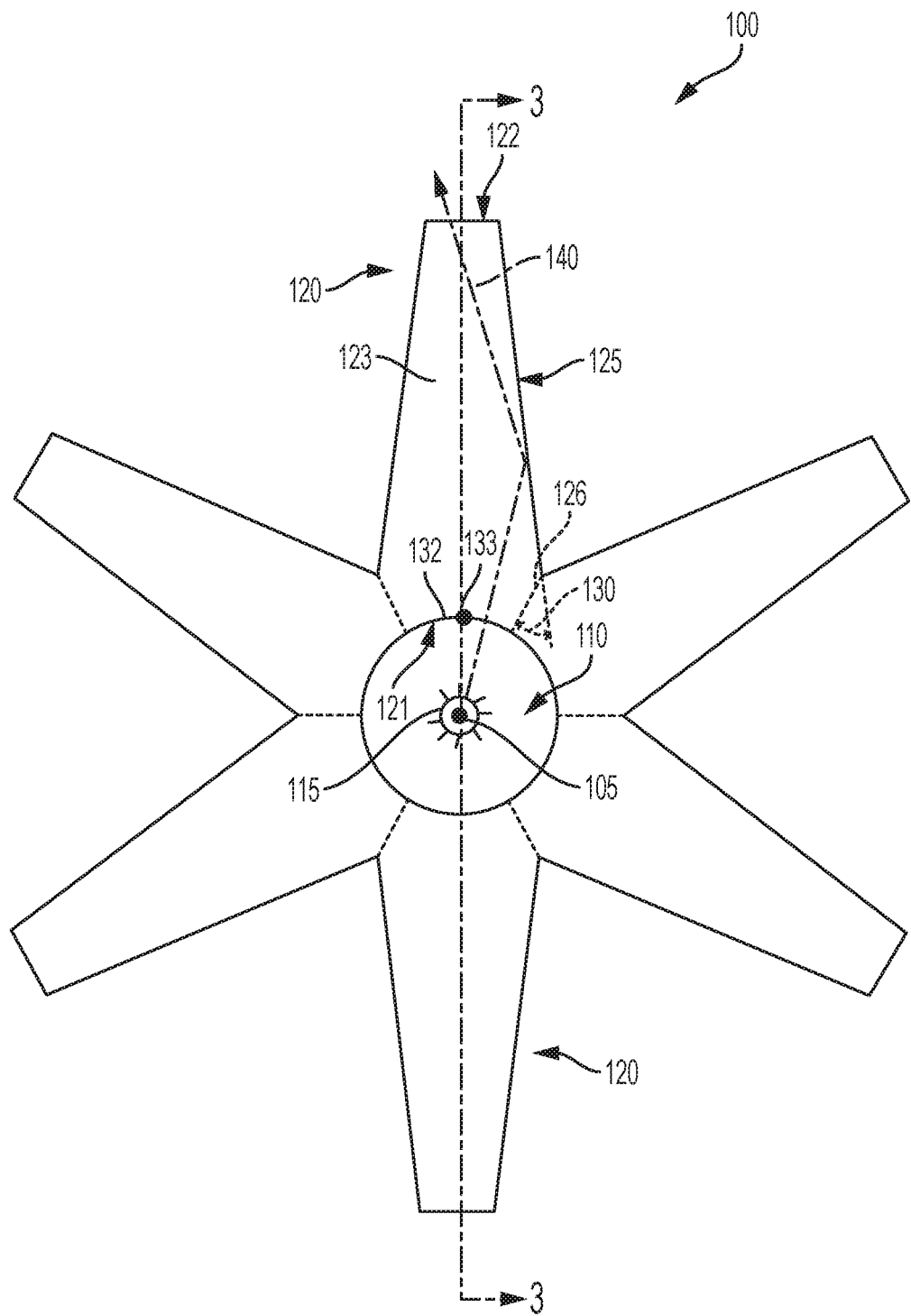
FIG. 2 is a top view of the illustrated embodiment of FIG. 1.
Figure 3:
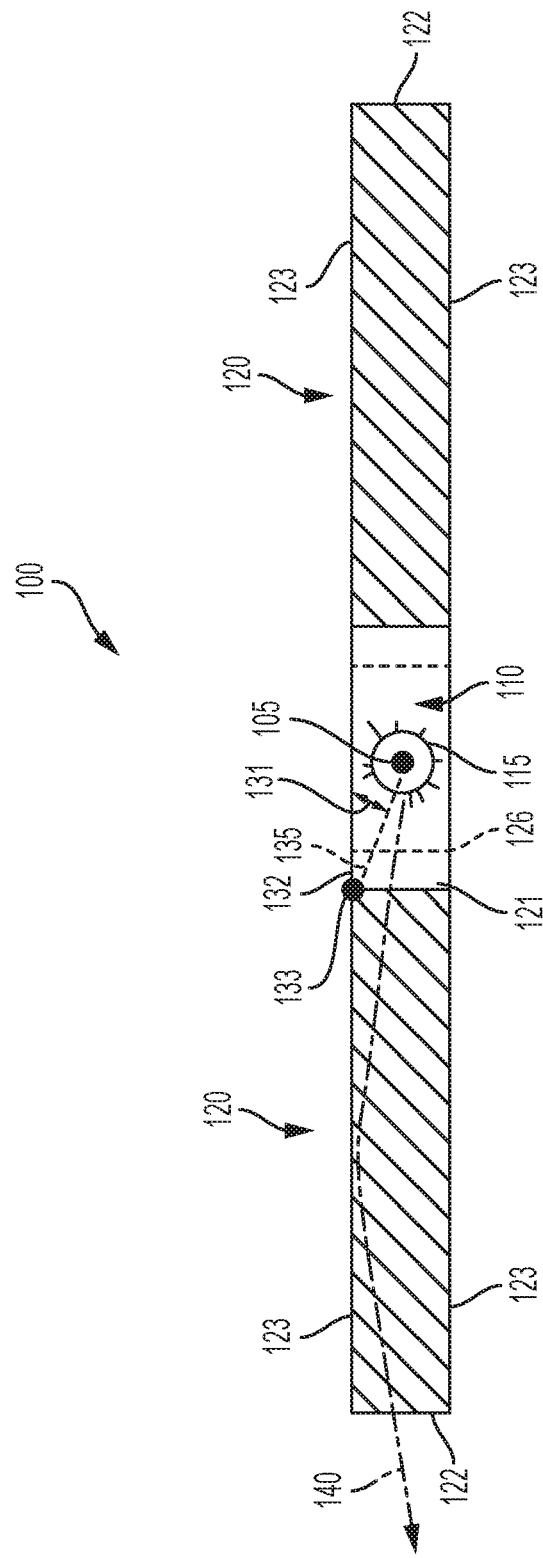
FIG. 3 is a longitudinal cross-sectional view of the embodiment as indicated in FIGS. 1 and 2.

FIG. 1 illustrates an isometric view of an output window embodiment of beam splitter 100, including a light source cavity 110 that houses a light source 115 located at the approximate geometric center 105 of beam splitter 100; and six radial arms 120 which surround light source cavity 110. Each radial arm 120 includes a curved light input window 121, light output window 122, top/bottom surfaces 123, side surfaces 125, and joining planes 126. Each radial arm 120 essentially forms a truncated tetrahedral structure that narrows as the distance from the light source 115 increases. Joining planes 126 are oriented coplanar with side surface intersection 127 and geometric center 105. The orientation of planar light output from light source 115 is roughly parallel to top/bottom surfaces 123 of radial arm 120. The specific height and width of light output window 122 may be governed by the corresponding dimensions of a potential abutting light pipe or optical fiber. Other geometry of beam splitter 100 is adaptable within the constraints that acute angle 130, measured between the extended plane of side surface 125 and joining plane 126 (see FIG. 2), and acute angle 131, measured between the extended plane of top/bottom surface 123 and line 135 extending from geometric center 105 and terminating at midpoint 133 of top edge 132 of light input window 121 (see FIG. 3) are both less than the limiting angle $\theta_c$ for total internal reflection as expressed by Snell's Law in the form of:

$$\cos \theta_c = n_1/n_2 \qquad \text{(Equation 1)}$$

where $\theta_c$ is the acute angle between the incoming light ray and the reflecting surface, $n_1$ is the index of refraction of air and $n_2$ is the index of refraction of the optically transparent material forming the beam splitter 100 (note: Equation 1 is an identical corollary of Snell's Law often expressed as: sin $\theta_c = n_1/n_2$, where $\theta_c$ represents the acute angle between the incoming light ray and a line perpendicular to the reflecting surface.

Air has a nominal index of refraction of 1.00 and, preferably, beam splitter 100 is a transparent material having an index of refraction greater than 1.42. In many embodiments, the material is a clear polymer. Substituting and solving Equation 1 for $\theta_c$ results in a maximum limiting angle of 45.24° for acute angles 130 and 131. Geometries of radial arm 120 which meet this criteria for acute angles 130 and 131 thus will provide total internal reflection for efficient transmission of light ray 140 entering light input window 121 from light source 115 to and through light output window 122 (see FIGS. 2 and 3).

The stellate beam splitter provides a simple, compact, and flexible solution to the problem of multiplex splitting and directional control of light when incorporated with LED devices or other similar sources of light.

As shown, the radial arms have an approximately triangular prism shape (with the vertex distal from the light source chopped off). Alternatively, the radial arms may have a parabolic prism shape, which may enhance the transmission of light to the end of the radial arm; however, it may be more difficult to form.

Additionally, in some embodiments, the light source may be an LED light source that directs light primarily in a single direction at a very close range to the LED light source. In this configuration, the single direction LED light source may be converted to project light in a 360° radial direction (essentially forming a plane of light) using a conical or orated concave curve reflector, with the tip of the conical or rotated concave curve reflector oriented in the center of the LED light source. In operation, the conical reflector may be formed as part of the stellate beam splitter, such that the tip of the conical reflector points to the center of the LED light source.

There has been described a novel optical beam splitter. It should be understood that the specific formulations and methods described herein are exemplary and should not be construed to limit the claims below. Further, it is evident that those skilled in the art may now make numerous uses and modifications of the specific embodiments described without departing from the inventive concepts. For example: coatings may be applied to surfaces to enhance reflection, parallel surfaces may be tapered, or rectangular intersections of planes may be rounded. Consequently, the stellate beam splitter is to be construed as embracing each and every novel feature and novel combination of features present in and/or possessed by the compositions and methods described and by their equivalents.

What is claimed as new and desired to be protected by Letters Patent of the United States is:

1. A stellate beam splitter, comprising: a light cavity for receiving a light source; a plurality of radial arms oriented around the light cavity, each of the plurality of radial arms sharing two joining planes with two of the plurality of radial arms, the two joining planes oriented coplanar with a side surface intersection of corresponding arms of the plurality of radial arms, the two joining planes between corresponding arms of the plurality of radial arms, and oriented to intersect at a geometric center of the light cavity, the plurality of radial arms oriented to concentrate light emanating from the light source, the light being a planar light output from an LED, the light cavity sized such that there is an air interface between the LED and each of the plurality of radial arms, the planar light output roughly parallel to a top and a bottom surface of each of the plurality of radial arms, entering each of the plurality of radial arms at an end proximate to the light cavity and provide concentrated light at an end distal to the light cavity, wherein each of the plurality of radial arms is a light concentrator and forms a truncated tetrahedral structure, a side of the truncated tetrahedral structure each forming a portion of an edge of the light cavity; a plurality of light receivers selected from a group consisting of a light pipe and an optical fiber, oriented at the end distal to the light cavity receiving the concentrated light.

2. A stellate beam splitter, comprising: a light cavity for receiving a light source; a plurality of radial arms oriented around the light cavity, each of the plurality of radial arms sharing two joining planes with two of the plurality of radial arms, the two joining planes oriented coplanar with a side surface intersection of corresponding arms of the plurality of radial arms and a geometric center of the light cavity, the plurality of radial arms oriented to concentrate light emanating from the light source, the light being a planar light output from an LED, the light cavity sized such that there is an air interface between the LED and each of the plurality of radial arms, the planar light output roughly parallel to a top and a bottom surface of each of the plurality of radial arms, entering each of the plurality of radial arms at an end proximate to the light cavity and provide concentrated light at an end distal to the light cavity, wherein each of the plurality of radial arms narrows from the end proximate to the light cavity to the end distal to the light cavity and forms a truncated tetrahedral structure, a side of the truncated tetrahedral structure each forming a portion of an edge of the light cavity; a plurality of light receivers selected from a group consisting of a light pipe an optical fiber, oriented at the end distal to the light cavity receiving the concentrated light.

3. A stellate beam splitter, comprising: a light cavity for receiving a light source; a plurality of radial arms oriented around the light cavity, each of the plurality of radial arms sharing two joining planes with two of the plurality of radial arms, the two joining planes oriented coplanar with a side surface intersection of corresponding arms of the plurality of radial arms and oriented to intersect at a geometric center of the light cavity, wherein a total number of joining planes is equal to a total quantity of the plurality of radial arms, the plurality of radial arms oriented to concentrate light emanating from the light source, the light being a planar light output from an LED, the light cavity sized such that there is an air interface between the LED and each of the plurality of radial arms, the planar light output roughly parallel to a top and a bottom surface of each of the plurality of radial arms, entering each of the plurality of radial arms at an end proximate to the light cavity and provide concentrated light at an end distal to the light cavity, wherein each of the plurality of radial arms has an approximately triangular prism shape and forms a truncated tetrahedral structure, a side of the truncated tetrahedral structure each forming a portion of an edge of the light cavity; a plurality of light receivers selected from a group consisting of a light pipe and an optical fiber, oriented at the end distal to the light cavity receiving the concentrated light.

4. The stellate beam splitter of claim 3, wherein each of the plurality of radial arms has a side surface, the side surface being a surface running along the length of the radial arm and perpendicularly vertical as compared to the primary direction of light exiting the radial arm.

5. The stellate beam splitter of claim 3, wherein each of the plurality of radial arms has a joining plane, the joining plane being a plane extending radially from a center of the light cavity to the point where any two side surfaces of the plurality of radial arms intersect.

6. The stellate beam splitter of claim 5, wherein the angle between the joining plane and the side surface is less than a critical angle for total internal reflection, based on an index of refraction for a material that the plurality of radial arms comprise and an index of refraction for air surrounding the plurality of radial arms.

7. The stellate beam splitter of claim 6, wherein the material is a transparent material and the index of refraction for the material is greater than 1.4.

8. The stellate beam splitter of claim 6, wherein a conical or rotated curve reflector is oriented in the light cavity, the reflector positioned to be centered on the light source, such that light from the light source reflects in an approximately planar fashion.

9. The stellate beam splitter of claim 2, wherein each of the plurality of radial arms is a light concentrator.

10. The stellate beam splitter of claim 3, wherein each of the plurality of radial arms is a light concentrator.

11. The stellate beam splitter of claim 1, wherein each of the plurality of radial arms has an approximately triangular prism shape.

12. The stellate beam splitter of claim 2, wherein each of the plurality of radial arms has an approximately triangular prism shape.

13. The stellate beam splitter of claim 1, wherein each of the plurality of radial arms narrows from the end proximate to the light cavity to the end distal to the light cavity.

14. The stellate beam splitter of claim 3, wherein each of the plurality of radial arms narrows from the end proximate to the light cavity to the end distal to the light cavity.

15. The stellate beam splitter of claim 1, wherein each of the plurality of radial arms has an index of refraction greater than one.

16. The stellate beam splitter of claim 2, wherein each of the plurality of radial arms has an index of refraction greater than one.

17. The stellate beam splitter of claim 3, wherein each of the plurality of radial arms has an index of refraction greater than one.

* * * * *